(12) United States Patent
Wong et al.

(10) Patent No.: US 7,078,849 B2
(45) Date of Patent: Jul. 18, 2006

(54) LONGITUDINAL PIEZOELECTRIC OPTICAL LATCHING RELAY

(75) Inventors: Marvin Glenn Wong, Woodland Park, CO (US); Arthur Fong, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 621 days.

(21) Appl. No.: 09/999,590

(22) Filed: Oct. 31, 2001

(65) Prior Publication Data

US 2003/0080650 A1 May 1, 2003

(51) Int. Cl.
*H01L 41/08* (2006.01)

(52) U.S. Cl. .................. 310/330; 310/331; 350/96.15; 385/25; 359/290

(58) Field of Classification Search ......... 310/330–332, 310/328; 350/96.15, 96.2; 385/16–19, 25, 385/26, 41, 42, 43; 359/290, 291, 293, 295, 359/296

See application file for complete search history.

(56) References Cited

U.S. PATENT DOCUMENTS

| | | | |
|---|---|---|---|
| 2,312,672 A | 3/1943 | Pollard, Jr. | |
| 2,564,081 A | 8/1951 | Schilling | |
| 3,430,020 A | 2/1969 | Von Tomkewitsch et al. | |
| 3,529,268 A | 9/1970 | Rauterberg | |
| 3,600,537 A | 8/1971 | Twyford | |
| 3,639,165 A | 2/1972 | Rairden, III | |
| 3,657,647 A | 4/1972 | Beusman et al. | |
| 4,103,135 A | 7/1978 | Gomez et al. | |
| 4,200,779 A | 4/1980 | Zakurdaev et al. | |
| 4,238,748 A | 12/1980 | Goullin et al. | |
| 4,245,886 A | 1/1981 | Kolodzey et al. | |

(Continued)

FOREIGN PATENT DOCUMENTS

| | | |
|---|---|---|
| EP | 0593836 | 10/1992 |
| FR | 2418539 | 9/1979 |
| FR | 2458138 | 12/1980 |
| FR | 2667696 | 4/1992 |
| JP | 36-18575 | 10/1961 |
| JP | 47-21645 | 10/1972 |
| JP | 62-276838 | 12/1987 |
| JP | 63-294317 | 12/1988 |
| JP | 8-125487 | 5/1996 |
| JP | 9-161640 | 6/1997 |
| WO | WO 99/46624 | 9/1999 |

OTHER PUBLICATIONS

Jonathan Simon et al., "A Liquid–Filled Microrelay With A Moving Mercury Microdrop", Journal of Microelectromechanical Systems, vol. 6, No. 3, Sep. 1977, pp. 208–216.

(Continued)

*Primary Examiner*—Mark Budd

(57) ABSTRACT

The present invention is a piezoelectrically actuated relay that latches. The relay operates by means of the longitudinal displacement of a piezoelectric element in extension mode. The piezoelectric element displaces a liquid metal drop and causing it to wet between at least one set of contact pads and at least one other set of contact pads. Positioning of the liquid metal causes the optical path to be blocked. The same motion that causes the liquid metal drop to change position can cause the optical path to be unblocked between the fixed pad and a contact pad on the piezoelectric element or substrate close to it.

The motion of the piezoelectric element is rapid and causes the imparted momentum of the liquid metal drop to overcome the surface tension forces that would hold the bulk of the liquid metal drop in contact with the contact pad or pads near the actuating piezoelectric element. The switch latches by means of surface tension and the liquid metal wetting to the contact pads.

9 Claims, 8 Drawing Sheets

U.S. PATENT DOCUMENTS

| | | | |
|---|---|---|---|
| 4,336,570 A | | 6/1982 | Brower et al. |
| 4,419,650 A | | 12/1983 | John |
| 4,434,337 A | | 2/1984 | Becker |
| 4,475,033 A | * | 10/1984 | Willemsen et al. ......... 250/227 |
| 4,505,539 A | | 3/1985 | Auracher et al. |
| 4,582,391 A | | 4/1986 | Legrand |
| 4,628,161 A | | 12/1986 | Thackrey |
| 4,652,710 A | | 3/1987 | Karnowsky et al. |
| 4,657,339 A | * | 4/1987 | Fick ........................... 350/96.2 |
| 4,742,263 A | | 5/1988 | Harnden, Jr. et al. |
| 4,786,130 A | * | 11/1988 | Georgiou et al. ........ 350/96.15 |
| 4,797,519 A | | 1/1989 | Elenbaas |
| 4,804,932 A | | 2/1989 | Akanuma et al. |
| 4,988,157 A | | 1/1991 | Jackel et al. |
| 5,278,012 A | | 1/1994 | Yamanaka et al. |
| 5,415,026 A | | 5/1995 | Ford |
| 5,502,781 A | * | 3/1996 | Li et al. ......................... 385/4 |
| 5,644,676 A | | 7/1997 | Blomberg et al. |
| 5,675,310 A | | 10/1997 | Wojnarowski et al. |
| 5,677,823 A | | 10/1997 | Smith |
| 5,751,074 A | | 5/1998 | Prior et al. |
| 5,751,552 A | | 5/1998 | Scanlan et al. |
| 5,828,799 A | | 10/1998 | Donald |
| 5,841,686 A | | 11/1998 | Chu et al. |
| 5,849,623 A | | 12/1998 | Wojnarowski et al. |
| 5,874,770 A | | 2/1999 | Saia et al. |
| 5,875,531 A | | 3/1999 | Nellissen et al. |
| 5,886,407 A | | 3/1999 | Polese et al. |
| 5,889,325 A | | 3/1999 | Uchida et al. |
| 5,912,606 A | | 6/1999 | Nathanson et al. |
| 5,915,050 A | * | 6/1999 | Russell et al. .................. 385/7 |
| 5,972,737 A | | 10/1999 | Polese et al. |
| 5,994,750 A | | 11/1999 | Yagi |
| 6,021,048 A | | 2/2000 | Smith |
| 6,180,873 B1 | | 1/2001 | Bitko |
| 6,201,682 B1 | | 3/2001 | Mooij et al. |
| 6,207,234 B1 | | 3/2001 | Jiang |
| 6,212,308 B1 | | 4/2001 | Donald |
| 6,225,133 B1 | | 5/2001 | Yamamichi et al. |
| 6,278,541 B1 | * | 8/2001 | Baker ........................... 359/291 |
| 6,304,450 B1 | | 10/2001 | Dibene, II et al. |
| 6,320,994 B1 | * | 11/2001 | Donald et al. ................ 385/16 |
| 6,323,447 B1 | | 11/2001 | Kondoh et al. |
| 6,351,579 B1 | | 2/2002 | Early et al. |
| 6,356,679 B1 | | 3/2002 | Kapany |
| 6,373,356 B1 | | 4/2002 | Gutierrez et al. |
| 6,396,012 B1 | | 5/2002 | Bloomfield |
| 6,396,371 B1 | | 5/2002 | Streeter et al. |
| 6,408,112 B1 | * | 6/2002 | Bartels ......................... 350/16 |
| 6,446,317 B1 | | 9/2002 | Figueroa et al. |
| 6,453,086 B1 | | 9/2002 | Tarazona |
| 6,470,106 B1 | | 10/2002 | McClelland et al. |
| 6,487,333 B1 | * | 11/2002 | Fouquet et al. ............... 385/18 |
| 6,501,354 B1 | | 12/2002 | Gutierrez et al. |
| 6,512,322 B1 | | 1/2003 | Fong et al. |
| 6,515,404 B1 | | 2/2003 | Wong |
| 6,516,504 B1 | | 2/2003 | Schaper |
| 6,559,420 B1 | | 5/2003 | Zarev |
| 6,633,213 B1 | | 10/2003 | Dove |
| 2002/0037128 A1 | | 3/2002 | Burger et al. |
| 2002/0146197 A1 | | 10/2002 | Yong |
| 2002/0150323 A1 | | 10/2002 | Nishida et al. |
| 2002/0168133 A1 | | 11/2002 | Saito |
| 2003/0035611 A1 | | 2/2003 | Shi |

OTHER PUBLICATIONS

Joonwon Kim et al., "A Micromechanical Switch With Electrostatically Driven Liquid–Metal Droplet", 4 pages.

Marvin Glenn Wong, "Laser Cut Channel Plate For A Switch", Patent application, 11 pages of specifications, 5 pages of claims, 1 page of abstract, and 4 sheets of formal drawings (Fig. 1–10).

Homi C. Bhedwar et al., "Ceramic Multilayer Package Fabrication", Nov. 1989, Electronic Materials Handbook, vol. 1 Packaging, Section 4: pp. 460–469.

Marvin Glenn Wong, "A Piezoelectricaly Actuated Liquid Metal Switch", May 2, 2002, patent application (pending), 12 pages of specification, 5 pages of claims, 1 page of abstract, and 10 sheets of drawings (Fig. 1–10).

Jonathan Simon et al., "A Liquid–Filled Microrelay With A Moving Mercury Microdrop", Journal of Microelectromechanical Systems, vol. 6, No.3, Sep. 1977, pp. 208–216.

Joonwon Kim et al., "A Micromechanical Switch With Electrostatically Driven Liquid–Metal Droplet", 4 pages.

* cited by examiner

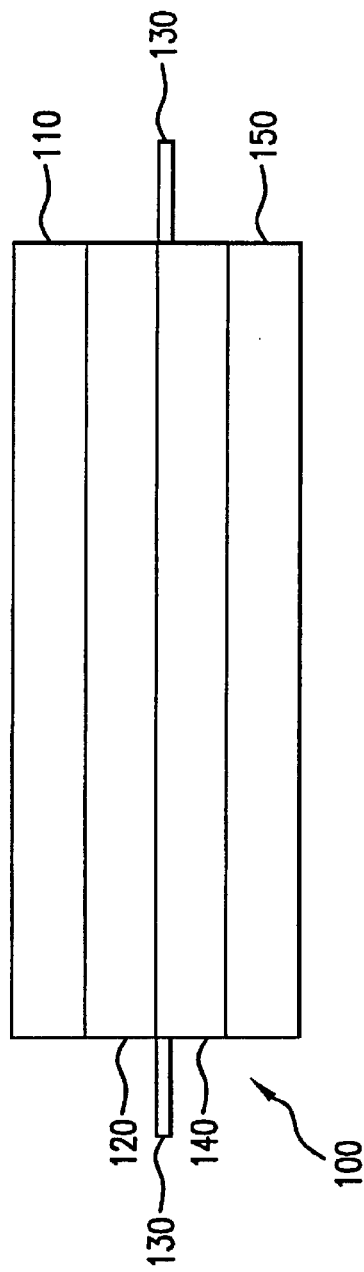
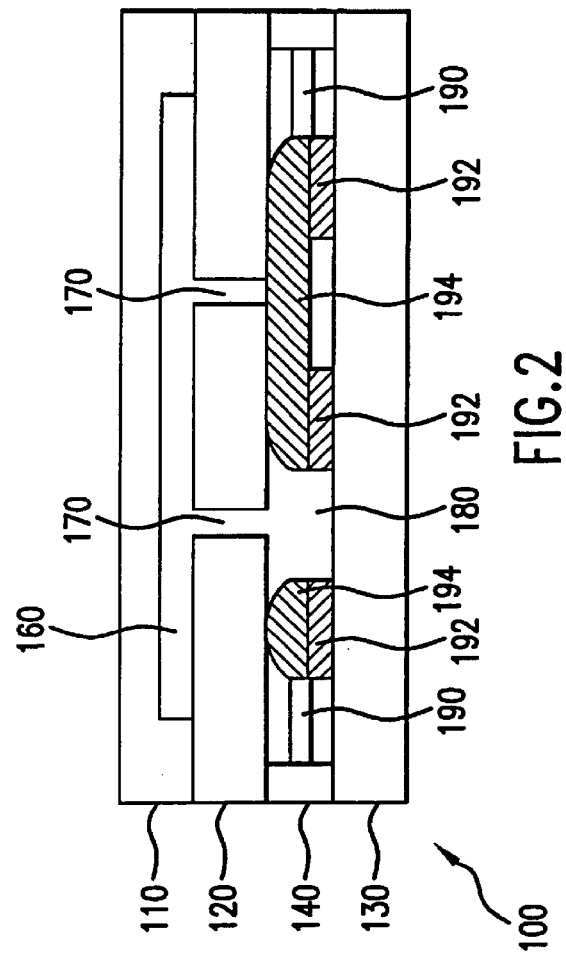

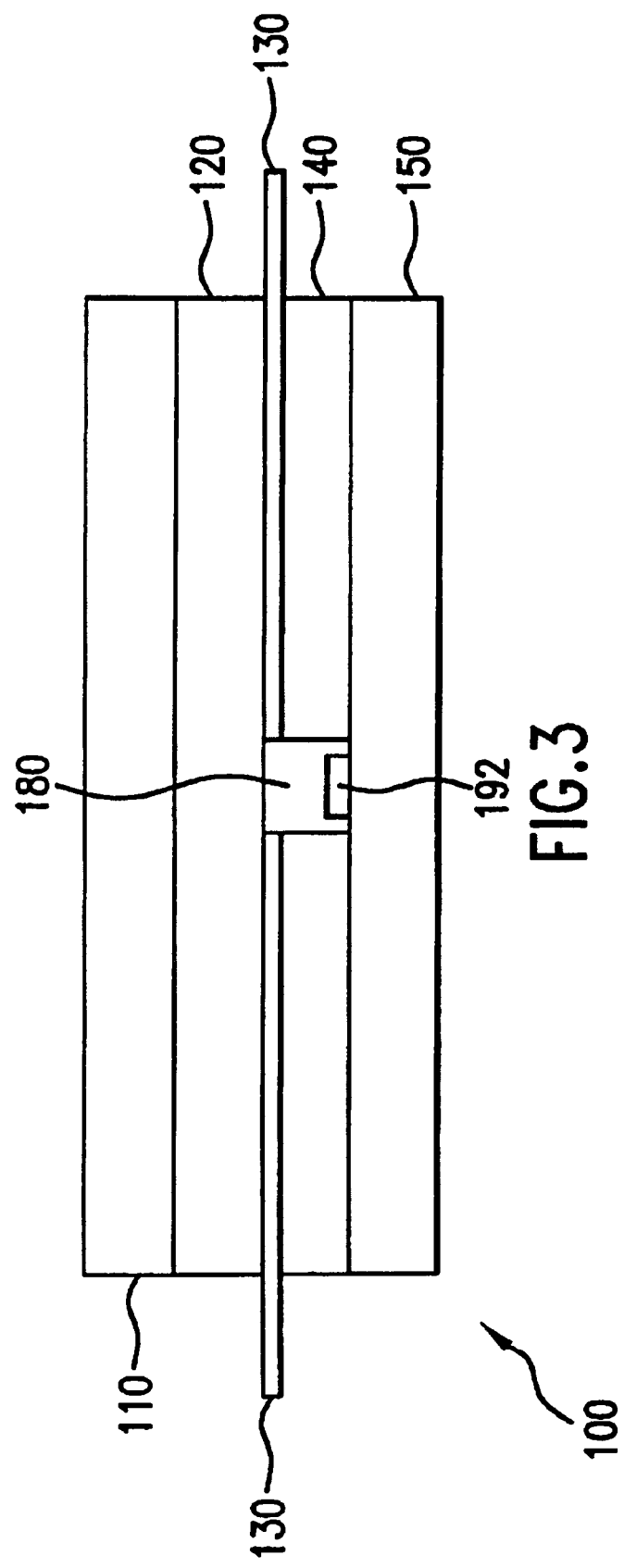

SECTION A-A

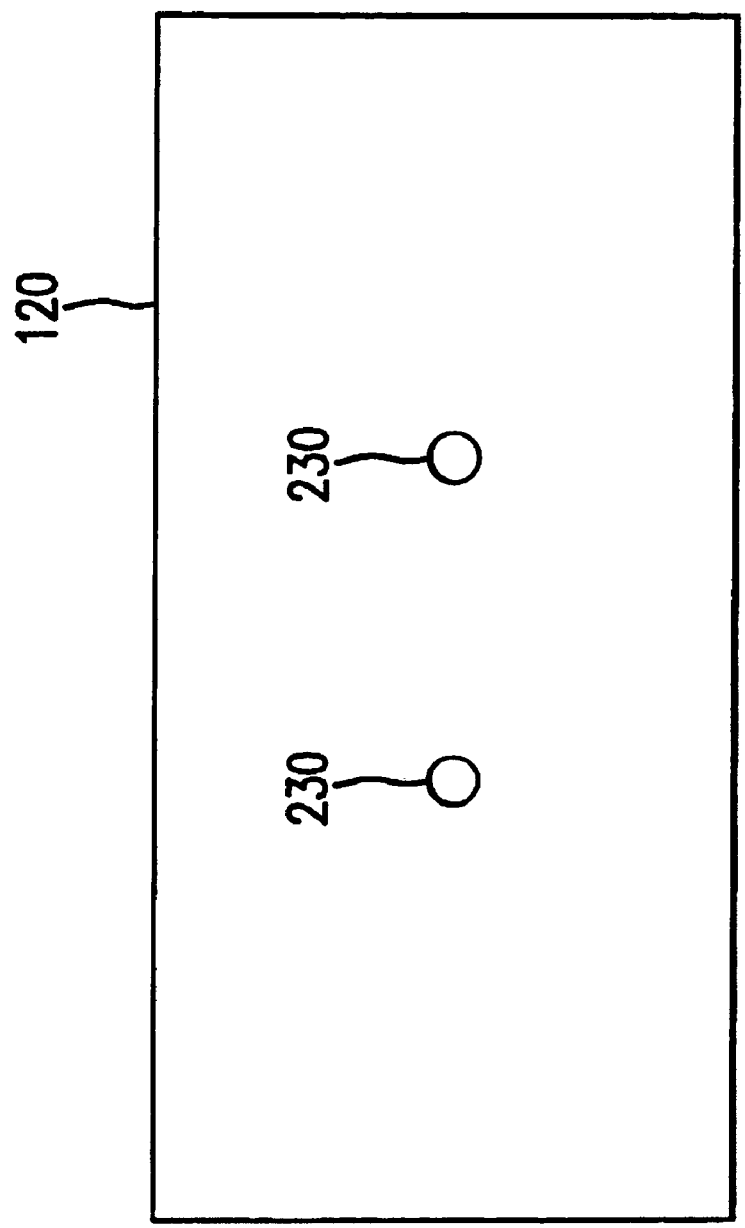

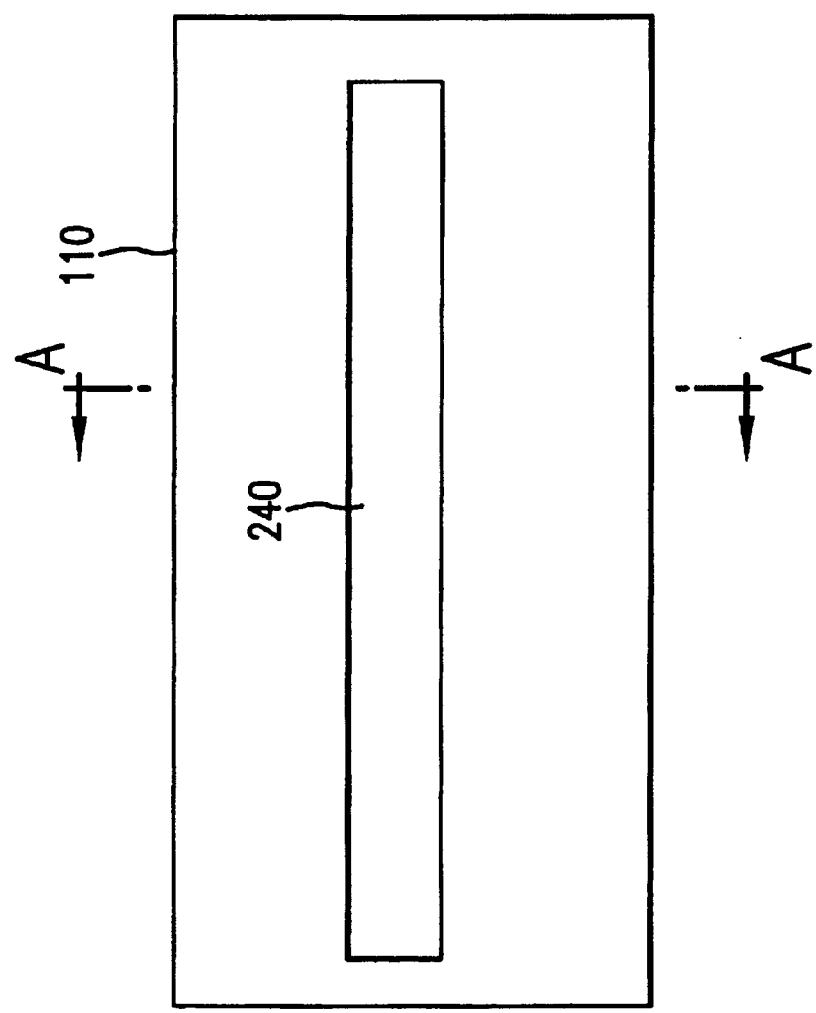

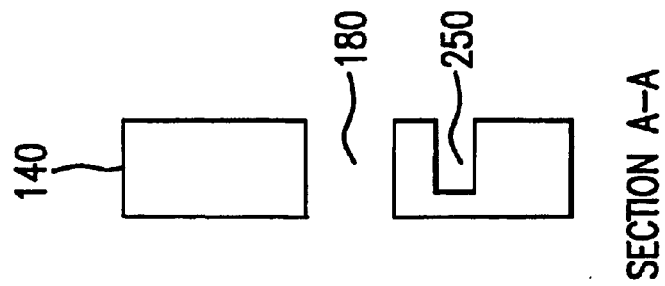
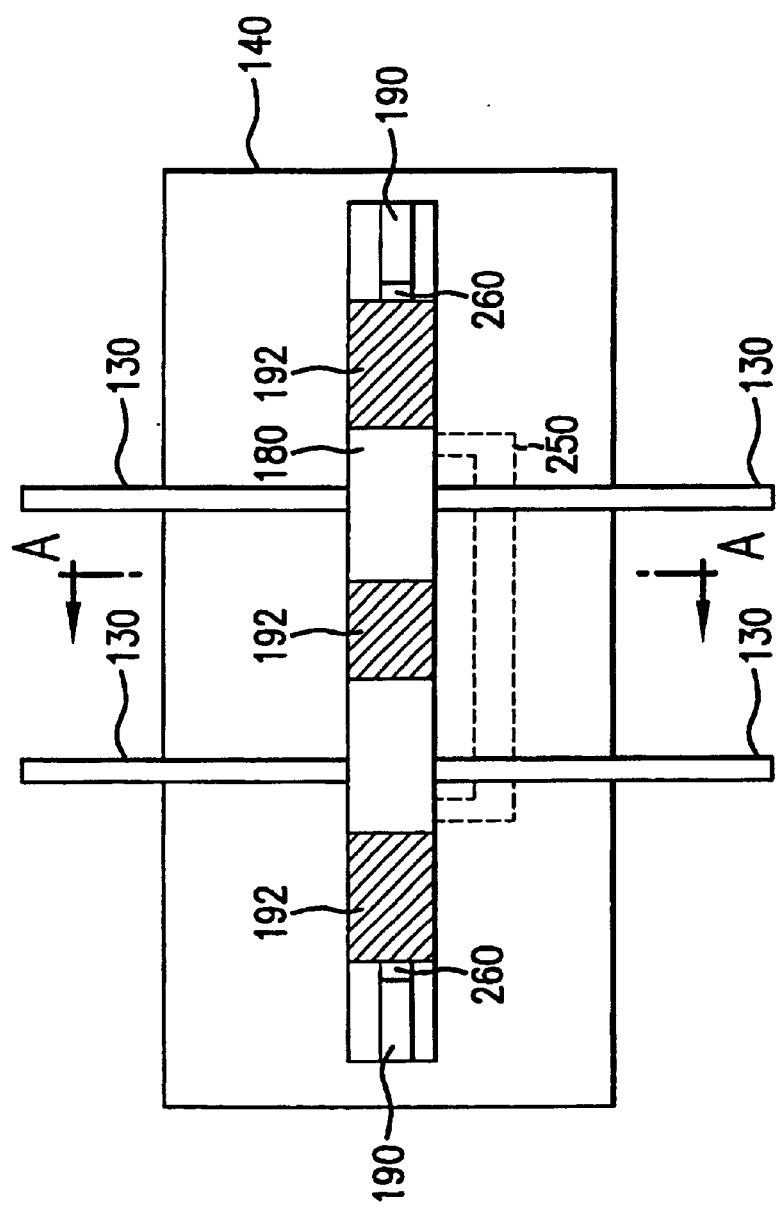
FIG.9B
FIG.9A

LONGITUDINAL PIEZOELECTRIC OPTICAL LATCHING RELAY

BACKGROUND

Piezoelectric materials and magnetostrictive materials (collectively referred to below as "piezoelectric materials") deform when an electric field or magnetic field is applied. Thus piezoelectric materials, when used as an actuator, are capable or controlling the relative position of two surfaces.

Piezoelectricity is the general term to describe the property exhibited by certain crystals of becoming electrically polarized when stress is applied to them. Quartz is a good example of a piezoelectric crystal. If stress is applied to such a crystal, it will develop an electric moment proportional to the applied stress.

This is the direct piezoelectric effect. Conversely, if it is placed on an electric field, a piezoelectric crystal changes its shape slightly. This is the inverse piezoelectric effect.

One of the most used piezoelectric materials is the aforementioned quartz. Piezoelectricity is also exhibited by ferroelectric crystals, e.g. tourmaline and Rochelle salt. These already have a spontaneous polarization, and the piezoelectric effect shows up in them as a change in this polarization. Other piezoelectric materials include certain ceramic materials and certain polymer materials. Since they are capable of controlling the relative position of two surfaces, piezoelectric materials have been used in the past as valve actuators and positional controls for microscopes. Piezoelectric materials, especially those of the ceramic type, are capable of generating a large amount of force. However, they are only capable of generating a small displacement when a large voltage is applied. In the case of piezoelectric ceramics, this displacement can be a maximum of 0.1% of the length of the material. Thus, piezoelectric materials have been used as valve actuators and positional controls for applications requiring small displacements.

Two methods of generating more displacement per unit of applied voltage include bimorph assemblies and stack assemblies. Bimorph assemblies have two piezoelectric ceramic materials bonded together and constrained by a rim at their edges, such that when a voltage is applied, one of the piezoelectric materials expands. The resulting stress causes the materials to form a dome. The displacement at the center of the dome is larger than the shrinkage or expansion of the individual materials. However, constraining the rim of the bimorph assembly decreases the amount of available displacement. Moreover, the force generated by a bimorph assembly is significantly lower than the force that is generated by the shrinkage or expansion of the individual materials.

Stack assemblies contain multiple layers of piezoelectric materials interlaced with electrodes that are connected together. A voltage across the electrodes causes the stack to expand or contract. The displacement of the stack is equal to the sum of the displacements of the individual materials. Thus, to achieve reasonable displacement distances, a very high voltage or many layers are required. However, convention stack actuators lose positional control due to the thermal expansion of the piezoelectric material and the material(s) on which the stack is mounted.

Due to the high strength, or stiffness, of piezoelectric material, it is capable of opening and closing against high forces, such as the force generated by a high pressure acting on a large surface area. Thus, the high strength of the piezoelectric material allows for the use of a large valve opening, which reduces the displacement or actuation necessary to open or close the valve.

With a conventional piezoelectrically actuated relay, the relay is "closed" by moving a mechanical part so that two electrode components are in contact. The relay is "opened" by moving the mechanical part so the two electrode components are no longer in contact. The electrical switching point corresponds to the contact between the electrode components of the solid electrodes. Conventional piezoelectrically actuated relays, however, do not latch easily. If latching is available, a residual charge in the piezoelectric material is used or switch contacts that contain a latching mechanism is used.

Conventional optical relays and relay arrays use the creation of bubbles in the optical path to switch the optical signals and do not latch. Further, bubble type relays tend to have large power consumption and to generate unwanted heat.

SUMMARY

The present invention is directed to a microelectromechanical system (MEMS) actuator assembly. Moreover, the present invention is a piezoelectrically actuated optical relay that switches and latches by means of a liquid metal such as mercury.

The present invention is a piezoelectrically actuated relay that latches. The relay operates by means of the longitudinal displacement of a piezoelectric element in extension mode. The piezoelectric element displaces a liquid metal drop and causing it to wet between at least one set of contact pads and at least one other set of contact pads. Positioning of the liquid metal causes the optical path to be blocked. The same motion that causes the liquid metal drop to change position can cause the optical path to be unblocked between the fixed pad and a contact pad on the piezoelectric element or substrate close to it.

The motion of the piezoelectric element is rapid and causes the imparted momentum of the liquid metal drop to overcome the surface tension forces that would hold the bulk of the liquid metal drop in contact with the contact pad or pads near the actuating piezoelectric element. The switch latches by means of surface tension and the liquid metal wetting to the contact pads.

DESCRIPTION OF THE DRAWINGS

The invention can be better understood with reference to the following drawings. The components in the drawings are not necessarily to scale, emphasis instead being placed upon clearly illustrating the principles of the present invention.

FIG. 1 is a side view of an embodiment of the invention showing four layers of a relay 100.

FIG. 2 shows a cross sectional side view of an embodiment of a relay 100 in accordance with the invention.

FIG. 3 shows cross sectional view of an embodiment of a relay 100 in accordance with the invention.

FIG. 7 shows a top view of a via layer in accordance with the invention.

FIG. 8A shows a bottom view of a cap layer 110 in accordance with the invention.

FIG. 8B shows a cross-sectional view of a cap layer of a relay in accordance with the invention.

FIG. 9A is an alternate embodiment of the piezoelectric layer 140 showing the piezoelectric elements 190 and the chamber 180.

FIG. 9B shows a cross sectional perspective of a piezoelectric layer of a relay at point A—A of FIG. 9A.

DETAILED DESCRIPTION OF THE INVENTION

Figure 4A:
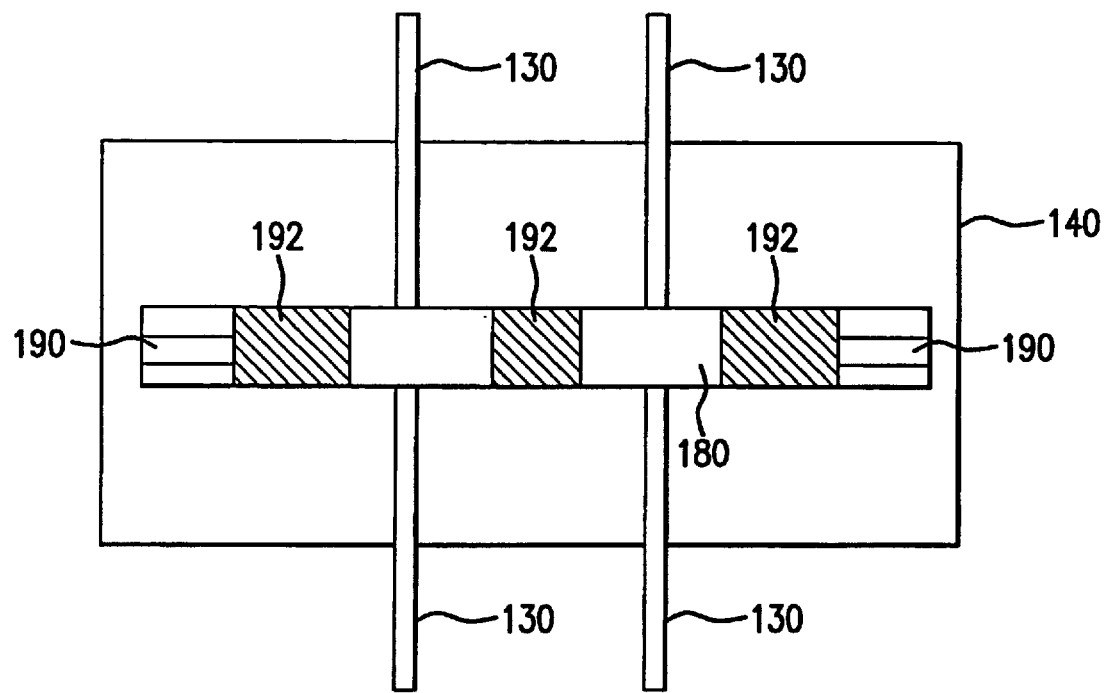
FIG. 4A shows a top view of the piezoelectric layer 130.

FIG. 1 is a side view of an embodiment of the invention showing four layers of a relay 100. The top layer 110 provides a cap for the switching mechanism of the relay 100 and provides a barrier for the switching mechanism of the relay 100. The second layer is a via layer 120. The third layer 140 is the piezoelectric layer and comprises the switching mechanism (not shown) of the relay 100. The cap layer 110 and the via layer 120 prevent exposure of the switching mechanism within the piezoelectric layer. Below the piezoelectric layer 140 is a substrate layer 150. The substrate layer 150 acts as a base and provides a common foundation for a plurality of circuit elements that may be present. A fiber optic path 130 is shown extending from the top portion of the piezoelectric layer 140. The fiber optic path 130 extends through the layer 140 providing a means for optical signal transmission.

FIG. 2 shows a cross sectional side view of an embodiment of a relay 100 in accordance with the invention. FIG. 2 is also a cross sectional view of FIG. 1. The substrate layer 130 forms solid layer that provides a barrier and/or a medium for connection with other electronic components. The cap layer 110 is a dielectric material having a relief chamber 160. The relief chamber 160 provides a means of venting pressure from a switching mechanism contained in the piezoelectric layer 140. The via layer 120 is a dielectric material having vias 170 connecting the relief chamber 160 with a switching chamber 180 of the piezoelectric layer. The chamber 180 of the piezoelectric layer 140 houses a switching mechanism for the relay 100.

The switching mechanism comprises a pair of piezoelectric elements 190, a plurality of switch contacts 192 and a moveable liquid 194. The piezoelectric elements 190 are positioned within the chamber 180 opposite to each other. The moveable liquid 194 is positioned in two portions between the piezoelectric elements 190. The moveable liquid 194 is electrically conductive and has physical characteristics that cause it to wet to the switch contacts 192. In a preferred embodiment of the invention, the moveable liquid 194 is a liquid metal capable of wetting to the switch contacts 192. One such liquid metal is germanium. In a most preferred embodiment of the invention, the liquid metal is mercury. The fiber optic path 130 travels into and out of the plane of the figure but is not shown in FIG. 2.

In operation, the switching mechanism operates by longitudinal displacement of the piezoelectric elements 190. An electric charge is applied to the piezoelectric elements 190 which causes the elements 190 to extend. Extension of one of the piezoelectric elements 190 displaces the moveable liquid drop 194. The extension of the piezoelectric elements 190 is quick and forceful causing a Ping-Pong effect on the liquid 194. The liquid 194 wets to the contact pads 192 causing a latching effect. When the electric charge is removed from the piezoelectric elements 190, the liquid does not return to its original position but remains wetted to the contact pad 192. In FIG. 2 the piezoelectric elements 190 on the left has been electrically charged causing extension and has physically shocked the liquid 194 causing a portion of it to Ping-Pong to the right where it combines with the liquid 194 which is wetted to the far right contact pad 192. As stated, the extension motion of the piezoelectric elements 190 is rapid and causes the imparted momentum of the liquid drop 194 to overcome the surface tension forces that hold the bulk of the liquid drop 194 in contact with the contact pad. The switching mechanism latches by means of the surface tension and the liquid 194 wetting to the contact pads.

FIG. 3 shows cross sectional view of an embodiment of a relay 100 in accordance with the invention. For reference purposes, FIG. 3 is a 90 degree view from that of FIG. 2. The cap layer 110, via layer 120, optical fiber 130, piezoelectric layer 140 and substrate layer 150 are stacked in accordance with the invention. Chamber 180 is shown in the piezoelectric layer 140 with a switch contact 192 attached to the substrate layer 150. The optical fiber 130 runs along the top of the piezoelectric layer 140. There is a break in the optical fiber 130 where the chamber 180 exists. In FIG. 3, the optical path between the two portions of the optical fiber 130 is unobstructed. Optical signals travelling along the optical fiber 130 will pass unobstructed from one portion of the fiber to the other. Not shown in FIG. 3 is the liquid metal 194. Positioning of the liquid metal causes the optical path to be blocked or unblocked.

FIG. 4A shows a top view of the piezoelectric layer 130. Piezoelectric elements 190 are positioned in opposition to each other within the liquid metal channel chamber 180. A moveable liquid disposed between the elements 190 are not shown. Three switch contacts 192 are shown disposed between the piezoelectric elements 190. Circuit traces for the piezoelectric elements are not shown. A person skilled in the art understands the placement and use of such circuit traces. A pair of optical fibers 130 run through the piezoelectric layer 140. The spacing of the fibers 130 is such that they intersect the chamber 180 at the gaps between the switch contacts 192. There is a break in the fibers 130 where they cross the chamber 180. As a portion of the moveable liquid (not shown) is moved so that it is disposed over two of the metal contacts (as shown in FIG. 2) a signal path of one of the optical fibers 130 is blocked.

Figure 4B:
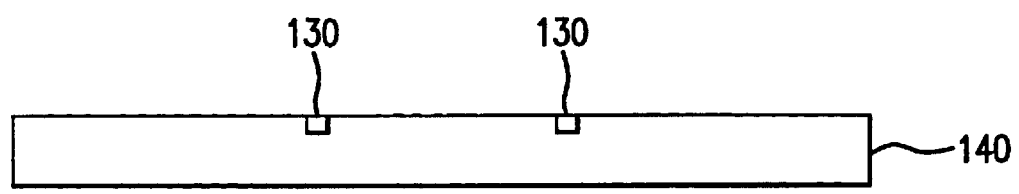
FIG. 4B shows a cross sectional side view of a piezoelectric layer of a relay in accordance with the invention.

FIG. 4B shows a cross sectional side view of a piezoelectric layer of a relay in accordance with the invention. A pair of optical fibers 130 are present in the top of the layer 140. The optical fibers are placed within grooves in the top of the piezoelectric layer 140. It is understood by those skilled in the art that the placement of the optical fibers 130 has alternatives within the scope of the invention. As an example, the fibers 130 can be placed in holes in the middle of the layer 140. Holes placed at any place in the piezoelectric layer are block-able by the moveable liquid 194.

Figure 5:
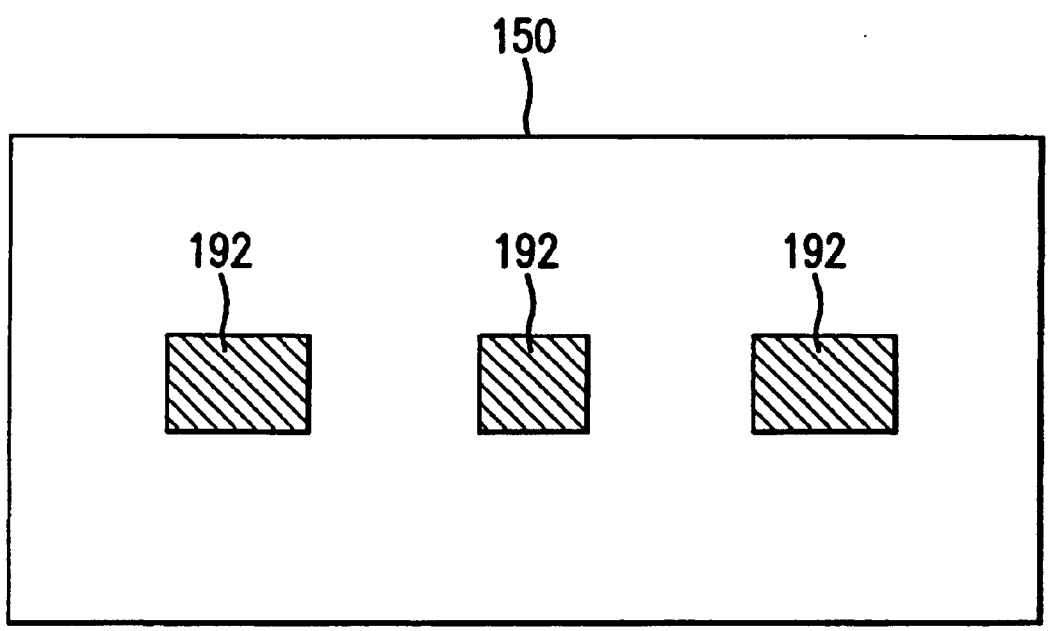
FIG. 5 shows a top level view of the substrate layer 150 with the switch contacts 192.

FIG. 5 shows a top level view of the substrate layer 150 with the switch contacts 192. The switch contacts 192 can be connected through the substrate 150 to solder balls (not shown) on the opposite side as shown in FIG. 5 for the routing of signals. Alternatively, circuit traces and contact pads 192 can be provided on the shown side of FIG. 5. The substrate layer 150 is a solid sheet of dielectric material. The substrate layer 150 acts to underlie the relay 100 forming the bottom of the chamber 140. Each of said contact pads 192 has at least a portion within the chamber.

Figure 6B:
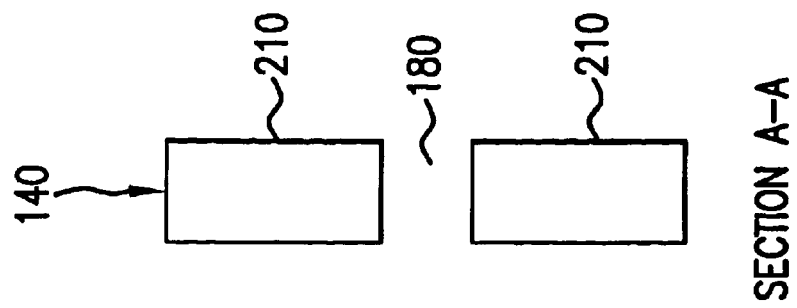
FIG. 6B shows a cross-sectional view of the piezoelectric layer of of a relay in accordance with the invention.
Figure 6A:
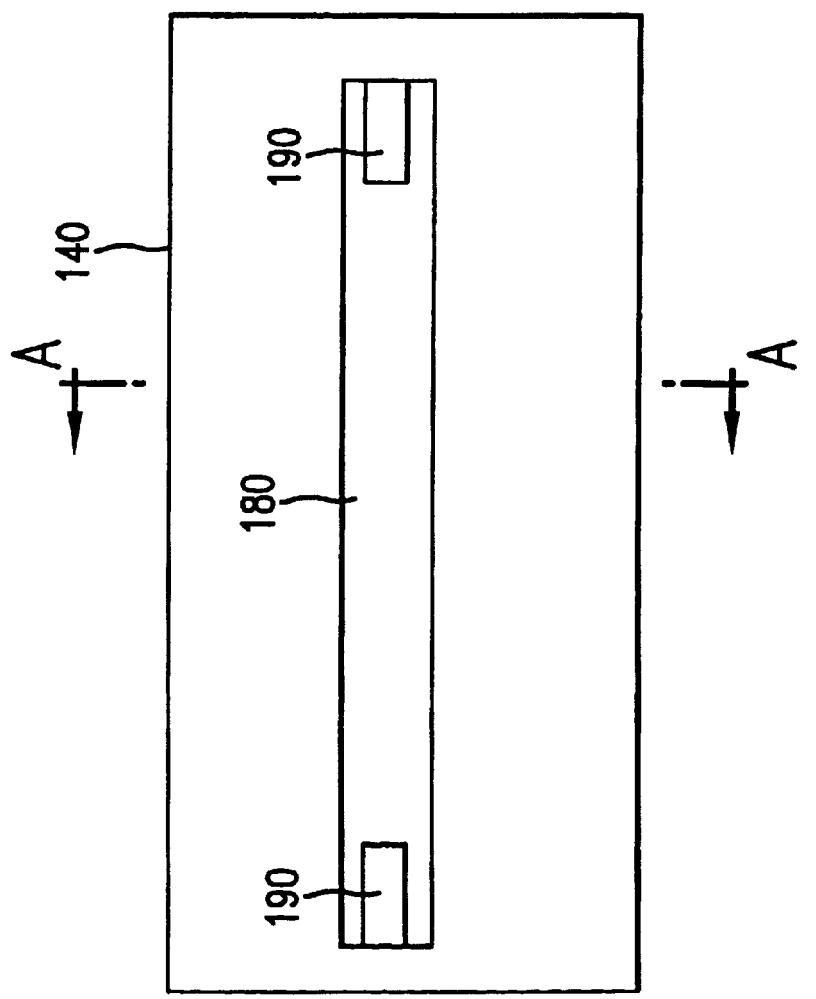
FIG. 6A is a top view of a piezoelectric layer of a relay showing the piezoelectric elements and the chamber.

FIG. 6A is a top view of a piezoelectric layer of a relay 100 showing the piezoelectric elements 190 and the chamber 180. The piezoelectric elements 190 are disposed in opposition to each other at the ends of the chamber 180. Circuit traces for the piezoelectric elements 190 and the moveable liquid 194 are not shown. FIG. 6B shows a cross-sectional view of the piezoelectric layer of FIG. 6. The piezoelectric layer 140 comprises an encapsulant 210 forming the sides of the chamber 180. As is understood by those skilled in the art, the encapsulant 210 is a dielectric material.

FIG. 7 shows a top view of a via layer 120 in accordance with the invention. The via layer 120 comprises a solid dielectric material and a pair of vias 230. The vias 230 provide passage of air from the chamber 140 (not shown) and the relief chamber 160 (not shown) in the cap layer 110.

FIG. 8A shows a bottom view of a cap layer 110 in accordance with the invention. The cap layer 110 comprises a solid dielectric material with a groove 240. The groove 240 acts as a relief chamber 160 when placed on top of the via layer 120. FIG. 8B shows a cross-sectional view of a cap layer 110 of a relay in accordance with the invention. In this example of a cap layer 110, the groove 240 does not extend all the way through the layer.

FIG. 9A is an alternate embodiment of the piezoelectric layer 140 showing the piezoelectric elements 190 and the chamber 180. A vent passage 250 couples the space between the contact pads 192. Circuit traces for the piezoelectric elements 190 and the moveable liquid 194 are not shown. The vent passage 1220 allows venting of the chamber 180 when the moveable liquid 194 is shocked from one side of the chamber 180 to the other. Venting of air allows unimpeded movement of the moveable liquid 194. The venting passage 220 coincides with the chamber 140 at points between the contact pads 192. Another alternative embodiment of the invention is shown in FIG. 9A. A wetting pad 260 is attached to the end of each of the piezoelectric elements 190. The addition of a wetting pad 260 increases the wetting of the liquid thereby improving the latching action of the relay.

FIG. 9B shows a cross sectional perspective of a piezoelectric layer of a relay at point A—A of FIG. 9A. In this embodiment, the venting passage 250 does not extend entirely through the entire thickness of the piezoelectric layer 140. It is understood by those skilled in the art that the venting passage 220 can extend entirely through the thickness of the piezoelectric layer 140 or it can extend only partially from either side. It is further understood by those skilled in the art that the optical fiber (not shown) will extend through the venting passage or the venting passage will be constructed in such a manner as to avoid the optical fiber.

In an embodiment of the invention utilizing the venting passage with the piezoelectric layer 140 as shown in FIGS. 7A and 7B it is understood by those skilled in the art that the via layer 120 and the relief chamber 160 are not required. In this alternate embodiment, a relay in accordance with the invention will comprise a solid cap layer 110 of a dielectric material, a piezoelectric layer 140 which houses the switching mechanism, and a substrate layer 150.

It is understood by those skilled in the art that the longitudinally displaceable piezoelectric elements shown in the figures are exemplary only. It is understood that a variety of piezoelectric modes exist which can be used while implementing the invention. For example, a bending mode piezoelectric element or a shear mode piezoelectric element can be used. It is further understood that the latching mechanism involved in the invention is independent of the means of imparting movement to the liquid. Any means capable of imparting sufficient force to cause the Ping-Pong effect suffices for purposes of this invention.

A relay in accordance with the invention can be made using micromachining techniques for small size. Also, the switching time for a relay in accordance with the invention is short. Piezoelectrically driven thermal inkjet printhead have firing frequencies of several kHz and a relay of the invention should be even have even faster frequencies since the fluid dynamics are much simpler than in an inkjet system. Heat generation should also be minimized as the only heat generators are the piezoelectric element and the passage of control and electric currents through the conductors of the switch.

While only specific embodiments of the present invention have been described above, it will occur to a person skilled in the art that various modifications can be made within the scope of the appended claims.

What is claimed is:

1. A latching piezoelectric optical relay comprising:

a first layer comprising a dielectric material;

a second layer positioned below said first layer and comprising a dielectric material;

a third layer positioned below said second layer comprising a dielectric material and a piezoelectric switching mechanism;

a fourth layer positioned below said third layer; and an optical path running through said third layer;

wherein said piezoelectric switching mechanism comprises a chamber; a first, second and third contact pad equally separated from each other, each of said contact pads having at least a portion within the chamber and where one of the separations between the pads intersects said optical path; a first and second piezoelectric element disposed in opposition to each other within said chamber, and a moveable conductive liquid within the chamber, with a first portion of the liquid wetted to the first of said of contact pads and a portion of the liquid wetted to both the second and third of said contact pads; and wherein said portion of the liquid wetted to said second and third of said contact pads is moveable toward said portion wetted to the first of said contact pads and wherein movement of said liquid causes said optical path to be blocked.

2. The relay of claim 1, wherein said first layer has a groove forming a chamber and said second layer has a pair of vias spaced to correspond with said separations between said pads.

3. The relay of claim 2, further comprising a second optical path intersecting the separation between the signal pads not intersected by the first optical path and wherein movement of said liquid causes said optical path to be unblocked.

4. The relay of claim 3, wherein said moveable liquid is mercury.

5. The relay of claim 3, wherein said moveable liquid is germanium.

6. The relay of claim 1, wherein the third layer further comprises a venting passage extending between the separations between said pads.

7. The relay of claim 6, further comprising a second optical path intersecting the separation between the signal pads not intersected by the first optical path and wherein movement of said liquid causes said optical path to be unblocked.

8. The relay of claim 7, wherein said moveable liquid is mercury.

9. The relay of claim 7, wherein said moveable liquid is germanium.

* * * * *